Figure 1:
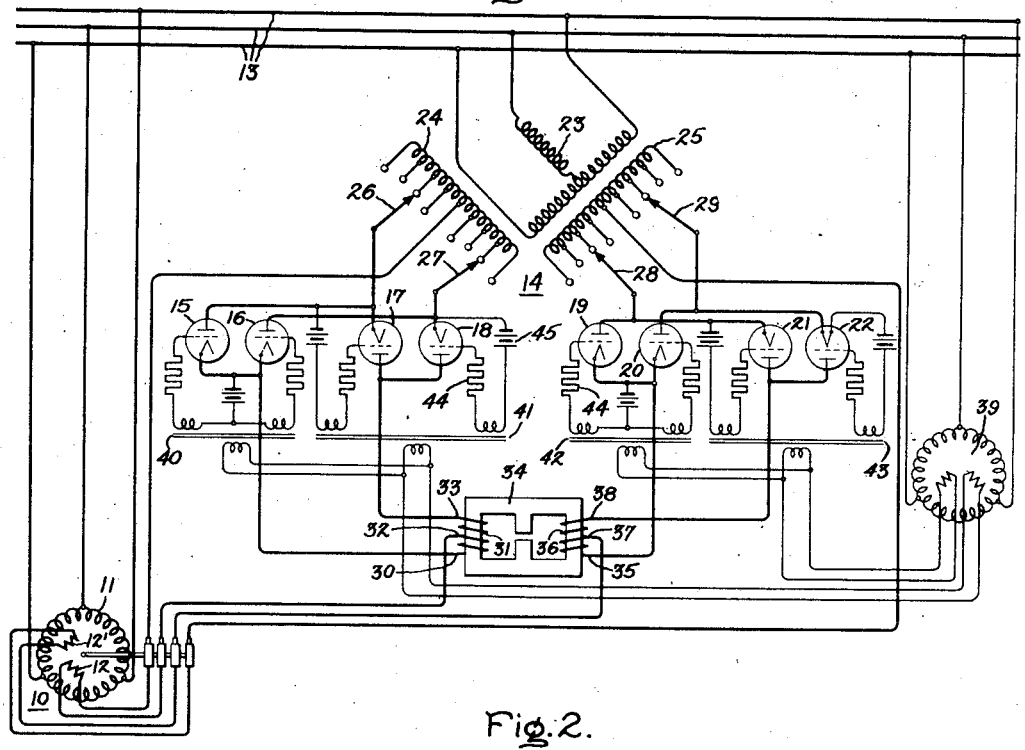

Dec. 2, 1941.                A. H. MITTAG                2,264,854
                    ELECTRIC VALVE CONVERTING SYSTEM
                         Filed April 30, 1940

Inventor:
Albert H. Mittag,
by Harry E. Dunham
His Attorney.

Patented Dec. 2, 1941

2,264,854

UNITED STATES PATENT OFFICE 2,264,854

ELECTRIC VALVE CONVERTING SYSTEM

Albert H. Mittag, Schenectady, N. Y., assignor to General Electric Company, a corporation of New York Application April 30, 1940, Serial No. 332,509

7 Claims. (Cl. 172—274)

My invention relates to electric valve converting systems and more particularly to electric valve frequency changing systems. The system of the present invention is well adapted for controlling the speed of an induction type dynamo-electric machine.

This application is a continuation-in-part of my application, Serial No. 193,894, filed March 4, 1938, and assigned to the same assignee as the present application.

Many electric valve converting systems employ groups of valves which are reversely connected with respect to a source of potential and with the result that circulating or short circuit currents tend to flow between the groups of valves at regular intervals during the operation of the system. In order to improve the efficiency and power factor of the system it would be desirable to provide means for limiting these circulating currents without at the same time introducing into the system a large impedance to normal load current.

It is an object of my invention, therefore, to provide a new and improved electric valve converting system.

It is another object of my invention to provide an electric valve converting system with improved means for limiting the interchange of current between the various groups of valves.

It is a still further object of my invention to provide an electric valve converting system particularly adapted for transferring energy between an alternating current circuit and the induced windings of an induction type dynamo-electric machine with improved means for limiting the circulating current between the various groups of valves of the system without introducing a large impedance to the useful, or load currents so that the efficiency and power factor of the system are improved.

In accordance with the illustrated embodiments of my invention, an electric valve converting system is employed for interconnecting the induced windings of an induction type dynamo-electric machine with an alternating current circuit to control the transfer of energy therebetween. The converting system includes a plurality of groups of valves associated with each of the electrically displaced winding sections of the induced winding of the dynamo-electric machine. Inter-connecting the groups of valves and each of the winding sections of the dynamo-electric machine is an inductive winding having two sections closely coupled magnetically. The inductive windings associated with the valves interconnecting each of the winding sections of the dynamo-electric machine with the alternating current circuit are mounted on a single three-legged magnetic core structure and are wound in such a way that their magnetomotive forces oppose each other.

My invention will be better understood by reference to the following description taken in connection with the accompanying drawing and its scope will be pointed out in the appended claims. In the drawing my invention is illustrated in Fig. 1 in connection with an electric valve converting system interconnecting a polyphase alternating current circuit and the induced windings of a dynamo-electric machine, and Fig. 2 diagrammatically illustrates an embodiment of my invention in which a quarter-phase induced winding of a dynamo-electric machine is interconnected with a single-phase of an alternating current circuit by an electric valve converting system embodying my invention.

Figure 2:
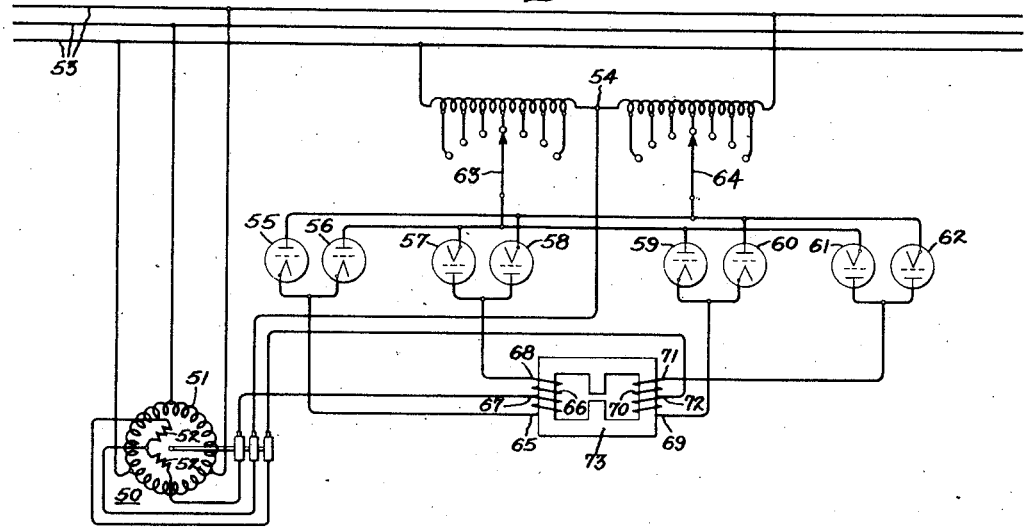

Referring now to Fig. 1 of the accompanying drawing, my invention is diagrammatically illustrated as applied to an electric valve converting system for controlling the operation of an induction motor 10 having an inducing or stator winding 11, and a quarter-phase induced or rotor winding having electrically displaced winding sections 12 and 12'. The stator winding 11 is connected to a suitable source of polyphase alternating current 13, whereas the induced or rotor winding is connected to a variable voltage alternating current circuit 14 through a plurality of groups of electric valves including the valves 15 to 22, inclusive. While for the purpose of simplicity of disclosure and explanation these valves have been shown as comprising an anode, a cathode and a control electrode enclosed within an envelope containing an ionizable medium, it of course will be understood that any other suitable controlled electric valve employing an ionizable medium and having an anode, a cathode, and some control member or means, may be employed. To control the magnitude of the voltage of the circuit 14 and hence to control an operating condition, such as the speed of the induction motor 10, there is provided a suitable arrangement such as a T-connected transformer having a primary winding 23 connected to the polyphase alternating current circuit 13 and a pair of secondary windings 24 and 25. The secondary winding 24 is provided with a pair of controllable or adjustable contact making mechanisms 26 and 27 whereas the secondary winding 25 is provided with adjustable contact making mechanisms 28 and 29, respectively.

The anodes of valves 15 and 16 are connected respectively to the contact making mechanisms 26 and 27 of the secondary winding 24 of the T-connected transformers and the cathodes of these valves are connected to one terminal 30 of an inductive winding 31, the midpoint 32 of which is connected through one of the induced winding sections 12 of the dynamo-electric machine 10 to the midpoint of the transformer secondary winding 24. The cathodes of valves 17 and 18 are connected respectively to the contact making mechanisms 26 and 27 respectively and the anodes thereof are connected to the opposite terminal 33 of the inductive winding 31, which serves to limit the interchange of current between these two groups of valves 15, 16 and 17, 18, when one of the valves of each of the two groups of valves is rendered conductive. The winding 31 is wound on one leg of a three-legged core structure 34 with the two sections between the midpoint and end terminals closely coupled magnetically so that there is a minimum of leakage reactance between these sections. The anodes of valves 19, 20 are connected respectively to the contact making mechanisms 28 and 29 of the secondary winding 25 of the T-connected transformer, and the cathodes thereof are connected to one terminal 35 of the inductive winding 36 the midpoint 37 of which is connected through the other of the rotor winding sections 12' of the dynamo-electric machine 10 to the midpoint of the transformer secondary winding 25. The cathodes of the remaining valves 21, 22 are connected respectively to the contact making mechanisms 28 and 29 of the transformer secondary winding 25 and the anodes thereof are connected to the opposite terminal 38 of the winding 36 which serves to limit the interchange of current between the groups of valves 19, 20 and 21, 22. As in the case of winding 31 the sections of winding 35 are wound on another leg of the core 34 and are closely coupled magnetically so that substantially the same flux links all of the turns of the winding. The third leg of the core 34 may be provided with an air gap, as illustrated.

In order to control the transfer of energy between the alternating current 13 and the alternating current circuit 14 there is provided an excitation system for the electric valves 15 to 22 which includes a suitable phase shifting device 39. This adjustable phase shifting device 39 impresses suitable alternating current potentials upon the control transformers 40 to 43 to control the groups of valves 15, 16; 17, 18; 19, 20; and 21, 22, respectively. Each of the control circuits for the various electric valves includes one of the secondary windings of the control transformers, a suitable current limiting resistor such as 44, and a source of biasing potential such as 45.

A better understanding of the operation and advantages of the invention may be had by first considering the operation of the system in general when the induction motor 10 is operating below synchronism. Under this condition power will be transmitted from the electrically displaced sections of the rotor winding 12 to the circuit 14 through the electric valves 15 to 22 operating as a frequency changer. The speed of the induction motor 10 may be controlled by controlling the voltage of the circuit 14 which is accomplished by the adjustment of the contact making mechanisms 26 to 29, inclusive. When the contact making mechanisms are in positions near the outer extremities of the secondary windings 24 and 25, the speed of the induction motor 10 will be a minimum since the opposing voltage against which the electric valves 16 to 22 are acting is a maximum. On the other hand when the contact controlling mechanisms 26 to 29 are positioned near or on the midpoint of the inductive windings 24 and 25, the opposing voltage against which the electric valves 15 to 22 are acting is at a minimum and hence the speed of the induction motor 10 is a maximum.

During half cycles of one polarity of rotor voltage, power is transmitted from the one section 12 of the rotor winding to the alternating current circuit 13 through the electric valves 15, 16 which conduct current alternately and from the other section of the rotor winding 12' to the circuit 13 through valves 19 and 20. The conductivities of the various electric valves 15 to 22 are controlled by the excitation circuit so that this power transfer is effected in accordance with the voltage of the circuit 13. Under these conditions it will be understood that the speed of the motor 10 may be controlled either by the adjustment of the contact controlling mechanisms 26 to 29, inclusive, or by the adjustment of the rotary phase shifting device 39. By suitable adjustment of the contact controlling mechanisms 26 to 29 and of the rotary phase shifting device 39, the desired operating speed and power factor condition within a certain range may be obtained for the dynamo-electric machine 10. An electric valve converting system of this type employing variable voltage means and phase shifting means for controlling the operation of an induction motor is disclosed and claimed in the copending application of E. F. W. Alexanderson, Serial No. 169,844, filed October 19, 1937, for Improvements in electric motor control systems, now Patent No. 2,236,984, July 1, 1941, and assigned to the same assignee as the present invention.

From the foregoing description of the operation of the system in general it will be apparent that at recurring intervals in the operation of the system current will tend to circulate in the valves of different groups associated with the same transformer winding. For example, the control members of valves 16 and 17 are energized by a positive potential at the same time so that at the period during which current is commutating from valve 15 to valve 16 the control electrode of valve 17 is also positive with respect to its associated cathode and there will be a tendency for current to circulate between valve 16 of one group and valve 17 of the other group.

In accordance with the present invention inductive windings 31 and 36 are mounted on a single core and utilized to limit the circulating current in the various groups of valves without at the same time introducing substantial impedance to normal or load currents. The inductive windings also serve to improve commutation of current between the valves. The action of these windings may best be understood by consideration of the current flowing in the different sections of each of these windings during successive half cycles of rotor voltage. During one half cycle of rotor voltage the current is transmitted alternately by valves 15 and 16 to the terminal 30 of winding 31, through the lower section of this winding to the middle terminal 32, from which it is conducted through one of the induced winding sections 12 and back to the middle terminal of the transformer winding 24. During the next successive half cycle of rotor voltage, current is transmitted through the same section of the rotor winding 12 in the opposite direction and through the upper half of winding 31, entering at the middle terminal 32 and leaving upper terminal 33, from which it is conducted alternately through valves 17 and 18 and the transformer winding 24 from the midtap of which a circuit to the winding section 12 is completed. It should be noted that for either direction of current flow through one of the winding sections 12 of the machine 10 the current flow in the sections of winding 31 is in the same direction and since the two halves of this winding are closely coupled the current in either half of the windings will establish a flux which links all of the turns of the entire winding. For this reason the reactor will offer practically no impedance to the reversal of current in the section 12 of the induced winding with which it is associated. The winding 31 does, however, offer considerable impedance to increases in current during the commutation period due to current circulating between the groups of valves. Any increase in current, due to the circulating current which flows through all of the turns of inductive winding 31, is opposed by the flux linkages established by the normal load current. In order to increase the effectiveness of the windings 31 and 36 as a means for limiting the circulating current and for improving the commutation of current between the various valves without materially increasing the reactance to the load or normal current, the windings are both mounted on the same core structure and are wound in such a direction that the magnetomotive forces due to the useful current in the windings oppose each other. This arrangement decreases the amount of core material required as compared with that required for two separate impedance devices and also increases the effectiveness of each of the windings due to the transformer action therebetween. This arrangement is particularly advantageous where the currents normally flowing in the two windings are electrically displaced. With the quarter-phase arrangement of induced windings illustrated, the current flowing in winding 36 is displaced ninety electrical degrees with respect to the current flowing in the winding 31. This means that the current through one of the windings 31 or 36 tends to be a maximum at the time that the current in the other winding tends to be a minimum and the effect of the transformer action is to tend to equalize these currents between the two windings so that the rotor current approaches a square wave form. It is also true that the transformer action between the windings renders the flux linkages of both windings effective to oppose any sudden increase in the current flowing in either of the windings due to circulating currents.

It will be apparent to those skilled in the art that the induction motor 10 may be operated as a generator above synchronism by providing the various groups of electric valves with an excitation circuit which will cause them to be rendered conductive in accordance with the frequency of the alternating current appearing in the induced or rotor winding 12. The various valves will then operate as rectifiers relative to the voltage of the alternating current circuit 13. Such excitation circuits are well known in the art and one example of such a circuit may be found in the above-mentioned copending Alexanderson application.

In Fig. 2 of the accompanying drawing, there is shown another embodiment of my invention as applied to the control system for an induction motor having a quarter-phase rotor winding arranged to interchange energy with a single-phase alternating current circuit which may be connected to one of the phases of the polyphase alternating current supply circuit. An induction motor 50 having an inducing winding 51 and a quarter-phase induced winding 52 is arranged so that the polyphase winding 51 is energized from a suitable source of polyphase alternating current 53. The quarter-phase rotor winding is interconnected with a single-phase alternating current circuit 54 by means of an electric valve converting system. This electric valve converting system includes a plurality of groups of valves 55, 56; 57, 58; 59, 60; and 61, 62. The single-phase alternating current circuit 54 may comprise an auto-transformer connected to one phase of the polyphase alternating current circuit 53 and this transformer may be provided with a midtap and suitable contact controlling mechanisms 63 and 64. The anodes of electric valves 55 and 60 and the cathodes of electric valves 58 and 62 are connected to the adjustable contact making mechanism 64. Similarly, the anodes of valves 56 and 59 together with the cathodes of valves 57 and 61 are connected to the adjustable contact mechanism 63. The cathodes of the group of valves 55 and 56 are connected to one terminal 65 of the inductive winding 66, the midpoint 67 of which is connected through one portion of the rotor winding 52 to the midpoint of the auto-transformer comprising the alternating current circuit 54. The anodes of the electric valves 57 and 58 are connected to the opposite terminal 68 of the inductive winding 66. Similarly, the cathodes of the group of valves 59 and 60 are connected to one terminal 69 of the inductive winding 70 and the anodes of the valves 61 and 62 are connected to the opposite terminal 71 of this winding, the midpoint 72 of which is connected through the other portion of the rotor winding 52 to the midpoint of the alternating current circuit 54. As described in connection with Fig. 1, the windings 66 and 70 are wound on separate legs of a three-legged core member 73, the third leg of which is preferably provided with an air gap. The turns of each winding 66 and 70 are closely coupled magnetically so that there is practically no leakage flux. A suitable excitation or control circuit similar to that disclosed in connection with Fig. 1 may be used to control the conductivities of these valves and hence to control the power factor at which power is transmitted to or received from the alternating current circuit 53. It will be apparent to those skilled in the art that the operation of this embodiment of the invention is substantially the same as that explained above in connection with the arrangement shown in Fig. 1.

While I have shown and described my invention as applied to a particular system of connections and as embodying various devices diagrammatically shown, it will be obvious to those skilled in the art that changes and modifications may be made without departing from the spirit of my invention and I, therefore, aim in the appended claims to cover all such changes and modifications as fall within the true spirit and scope of my invention.

What I claim as new and desire to secure by Letters Patent of the United States is:

1. In combination, a pair of alternating current circuits, one of said circuits being a quarter phase circuit, an electric valve converting system for transmitting energy between said circuits including a plurality of groups of electric discharge valves, means for limiting the current circulating between said groups of valves including an inductive device comprising a core structure and a winding having end terminals interconnecting certain of said groups of valves and an intermediate terminal connected to one phase of said quarter phase circuit and a second inductive winding associated with said core structure and having end terminals interconnecting other of said groups of valves and an intermediate terminal connected to a second phase of said quarter phase circuit so that opposite waves of current in said quarter phase circuit flow in different portions of said inductive windings during successive time intervals to impress a unidirectional magnetomotive force on said core structure, said inductive windings being wound on said core structure in such a manner that the ampere-turns of said inductive windings due to currents transmitted between said circuits are opposed.

2. In combination, a pair of alternating current circuits at least one of which is a polyphase circuit, an electric valve converting system interconnecting said circuits for transmitting energy therebetween and including a plurality of groups of electric discharge valves, means for limiting the interchange of current between said groups of valves including a core structure and a plurality of inductive windings each having end terminals associated with a different group of electric valves and a mid terminal connected with a different phase of said polyphase alternating current circuit so that both half waves of current flowing in said polyphase alternating current circuit establish a substantially continuous unidirectional magneto-motive force in said core structure, said windings being wound on said core structure in such a manner that said unidirectional magneto-motive forces oppose each other.

3. In combination, a pair of alternating current circuits of different frequencies at least one of which is a polyphase circuit, an electric valve frequency changer interconnecting said circuits for transmitting current therebetween and including a plurality of groups of electric discharge valves interconnecting each phase of said polyphase circuit and said other alternating current circuit, and means for limiting the interchange of current between the groups of electric valves associated with each of the phases of said polyphase circuit including an inductive device comprising a core structure and a winding interconnecting each phase of said polyphase circuit and the groups of electric valves associated therewith in such a manner that both half cycles of alternating current of said polyphase circuit establish a substantially continuous unidirectional magnetomotive force in said core structure, said windings being mounted on said core structure in such a manner that said unidirectional magnetomotive forces oppose each other.

4. An electric valve converting apparatus for controlling the interchange of power between an alternating current circuit and the electrically displaced sections of the induced winding of an induction type dynamo-electric machine comprising in combination a plurality of groups of electric discharge valves interconnecting said alternating current circuit with each of the electrically displaced sections of said induced windings, and means for limiting the interchange of current between said groups of valves including an inductive winding having a midtap connected with one of said electrically displaced windings and end terminals connected with certain of said groups of valves so that both half waves of current in said induced windings establish a unidirectional flux in the core associated with said inductive winding, a second inductive winding having end terminals connected with other of said groups of valves and a midtap connected with another of the electrically displaced winding sections of said induced winding and mounted on the same core with said first inductive winding and in such a manner that the magneto-motive forces of said windings oppose each other.

5. In combination, an alternating current circuit of one frequency, an alternating current circuit of a different frequency including an inductive winding having an intermediate terminal, an electric valve frequency changer interconnecting said circuits and including a plurality of groups of reversely connected valves interconnecting said inductive winding and the other said alternating current circuits, an excitation circuit for simultaneously rendering the valves of all of said groups alternately conductive and non-conductive at the frequency of the alternating current circuit of higher frequency, means for limiting the interchange of currents between the groups of reversely connected valves associated with said inductive winding without introducing substantial impedance to current transmitted between said inductive winding and the other of said alternating current circuits by said valve frequency changer including an inductive winding section connected in circuit with each of said groups of valves in said alternating current circuit of lower frequency, said winding sections being wound in closely coupled magnetic relation and in a direction to produce a flux in the same direction, and means independent of said groups of valves connecting said circuit of lower frequency with the intermediate terminal of said inductive winding.

6. In combination, a pair of alternating current circuits of different frequencies, an electric valve frequency changer interconnecting said circuits for transmitting energy therebetween including a plurality of groups of electric discharge valves, an excitation circuit for simultaneously rendering the valves of all of said groups alternately conductive and non-conductive at the frequency of one of said circuits, and inductive impedance means for limiting the flow of current between said groups of valves without substantially increasing the impedance to current transmitted between said circuits including a winding section interconnecting each of said groups of valves and one of said circuits, said winding sections being wound in closely coupled relation on a common magnetic core in such a direction that currents transmitted between said circuits produce a unidirectional flux in said core.

7. In combination, a pair of alternating current circuits of different frequencies, an electric valve frequency changer interconnecting said circuits for transmitting energy therebetween including a plurality of groups of electric discharge valves, an excitation circuit for simultaneously rendering the valves of all of said groups alternately conductive and non-conductive at the higher of said frequencies, an inductive impedance means for limiting the flow of current between valves of different groups without substantially increasing the impedance to currents transmitted between said circuits including an inductive winding connected in series with each of said groups of valves and the circuit of lower frequency, said windings being wound in closely coupled relation on a common core and in such a direction that current flowing during successive half waves of potential of said low frequency circuit cause a substantially continuous unidirectional flux in said core linking the turns of both of said windings.

ALBERT H. MITTAG.